April 26, 1932.  G. WRIGHT  1,856,046
THERMOSTATICALLY OPERATIVE VALVE
Filed Nov. 14, 1929  2 Sheets-Sheet 1
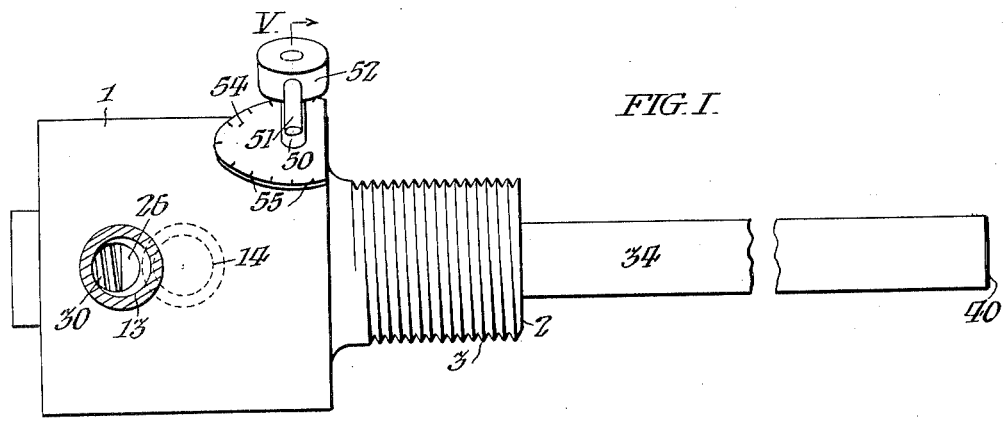
FIG. I.
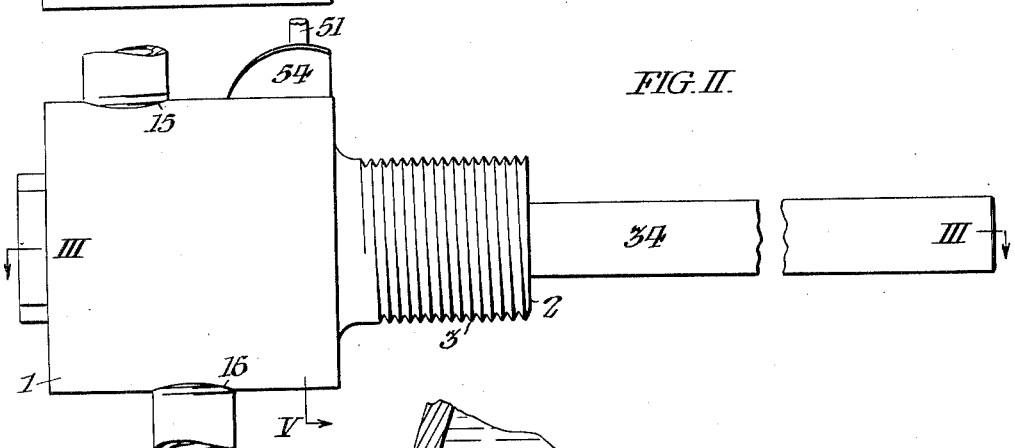
FIG. II.
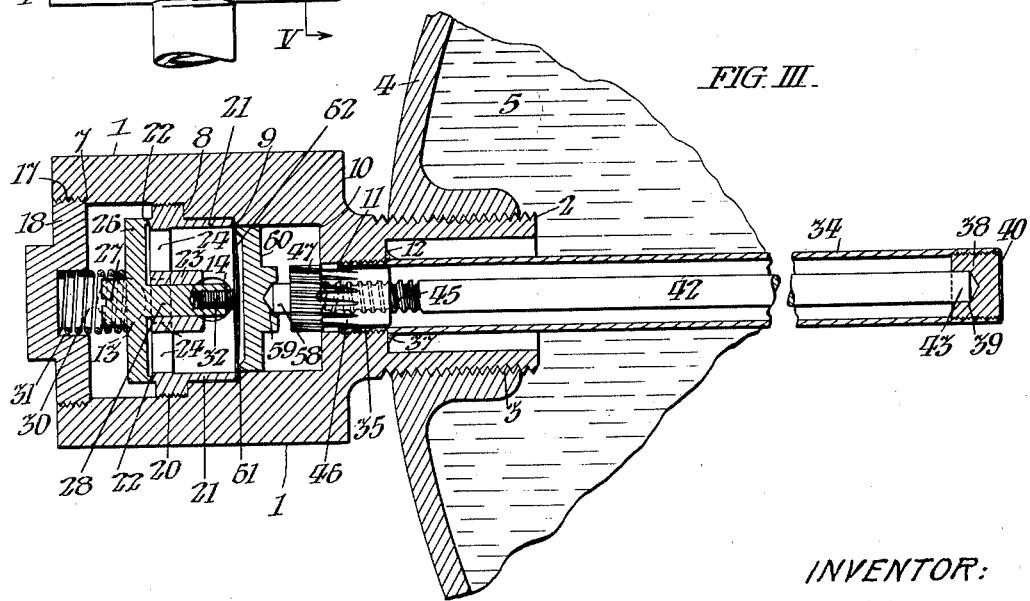
FIG. III.
INVENTOR:
GEORGE WRIGHT,
BY Arthur E. Paige,
Attorney.

April 26, 1932.  G. WRIGHT  1,856,046
THERMOSTATICALLY OPERATIVE VALVE
Filed Nov. 14, 1929  2 Sheets-Sheet 2
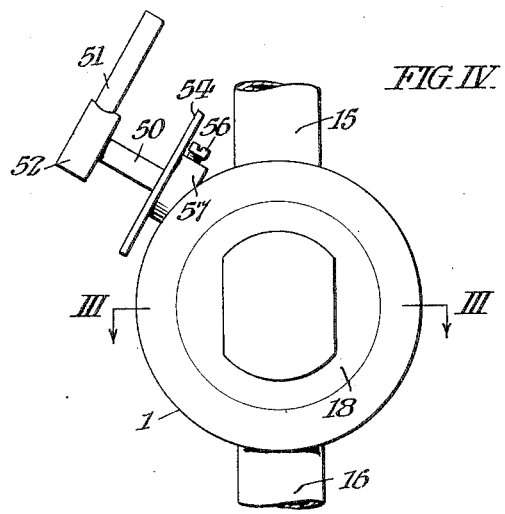
FIG. IV.
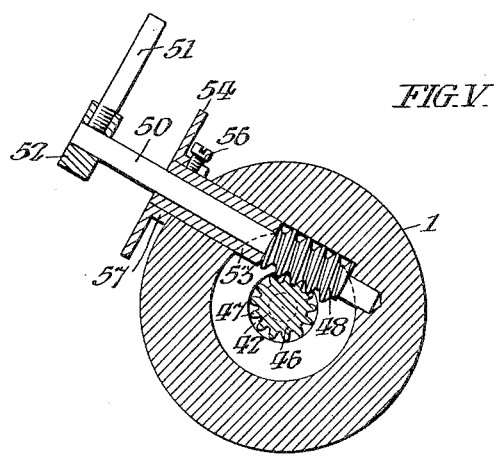
FIG. V.
INVENTOR:
GEORGE WRIGHT, Patented Apr. 26, 1932

1,856,046

UNITED STATES PATENT OFFICE

GEORGE WRIGHT, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA

THERMOSTATICALLY OPERATIVE VALVE

Application filed November 14, 1929. Serial No. 407,029.

My invention is applicable to control the flow of gas to a burner which is part of a water heater, by location of the thermostatic element in the body of water which is being heated. The thermostatic couple comprises a tube of copper, or other metal having a high coefficient of expansion, and containing a rod of another material having a coefficient of expansion which is substantially zero thruout the range of temperatures to which the couple is subjected. My invention includes means, accessible from the exterior of the valve casing, for adjustably varying the effective length of such inner member of said couple, and means interposed between said thermostatic couple and the valve, adapted to multiply the relative movement of said couple and effect snap action of the valve.

My invention includes the various novel features of construction and arrangement hereinafter more definitely specified, and an economical feature of the form of my invention hereinafter described is that the valve casing is adapted to be manufactured from a stock brass rod, by few and simple screw machine operations.

In said drawings; Fig. I is a plan view of a valve embodying my invention.

Fig. II is a side elevation of said valve.

Fig. III is a plan sectional view, taken on the diametrical line III, III in Fig. II.

Fig. IV is an outer end elevation of said valve.

Fig. V is a transverse sectional view of said valve, taken on the line V, V in Figs. I and II.

In said figures; the cup-shaped valve casing 1, which is adapted to be made of a cylindrical stock brass bar of the diameter of the largest portion thereof, is reduced at one end to form the tube 2 provided with the external screw thread 3 adapted for detachable engagement with the cylindrical wall 4 of a container for the water 5, the temperature of which controls the operation of the valve. Said casing is axially bored to form the plurality of internal circumferential shoulders 7, 8, 9, 10, 11, and 12, and has the gas inlet port 13 between said shoulders 7 and 8 and the gas outlet port 14 between said shoulders 8 and 9; said ports 13 and 14 being opposite radially drilled holes provided with respective screw threads for pipes 15 and 16. Said casing 1 has the screw thread 17 between said shoulder 7 and the outer end of the casing, for engagement with the casing closure plug 18. Said casing has the internal screw thread 20 between said shoulders 7 and 8 for engagement with the bushing tube 21 having the annular valve seat 22 and axial tubular bearing 23 surrounded by the circular series of gas openings 24, within the circle of said seat and affording a gas passage between said ports 13 and 14.

The disk valve 26 is fitted to said seat 22 and has axial stems 27 and 28 projecting from respectively opposite sides thereof; said stem 27 being encircled by the spring 30 which is seated at its outer end in the recess 31 in said closure 18 and tends to continually stress said valve toward said seat. Said stem 28 is mounted to reciprocate in said bearing 23 and has, at its inner end, the screw member 32 in coaxial engagement therewith and adapted to vary the effective length thereof. Said valve is adapted to be displaced from its seat by the cooperation of the thermostatic couple including the metallic tube 34, conveniently formed of copper, having one end screw threaded at 35 in engagement with said casing 1 and abutting against said shoulder 11 and sealed with cement 37 at said shoulder 12. The end of said tube 34 remote from said casing 1 is provided with the closure 38 which is conveniently a screw threaded plug having the axial recess 39 and sealed in engagement with said tube 34 by the film of solder 40. The other member of the thermostatic couple is the rod 42 formed of material having a coefficient of expansion less than that of said tube 34 and preferably formed of a ferric alloy having a coefficient of expansion which is substantially zero thruout the range of temperatures to which said couple may be subjected, i. e., from, say, 50° to 180° F. Said rod 42 has its end 43 tightly fitted in the recess 39 in said tube closure 38 and has its opposite end screw threaded at 45 for engagement with means carried by said rod, interposed between said valve 26 and said rod in said casing and adapted to vary the effective length of said rod. Such means include the nut 46 in coaxial relation with said rod and having the worm gear teeth 47 at its perimeter adapted to mesh with the worm 48 thruout the range of axial movement of said nut.

Said worm 48 has the shaft 50 extending exterior to said casing 1 and carrying the index member 51 which is conveniently a radial arm in screw threaded relation with the collar 52 which it is adapted to rigidly hold on said shaft. Said index member 51 is adapted to cooperate with the index member 54 which is a disk having a circular series of graduations 55. Said index disk 54 is rigidly connected with said casing in coaxial relation with said worm shaft, conveniently by the set screw 56 extending thru the hub 57 on said disk and engaging the tubular bearing 53 which is push fitted in said casing and in which said worm shaft 50 is journaled.

The effective length of said thermostatic rod 42 may be thus adjustably varied, in accordance with the degree of temperature of the water 5 which it is desired to maintain in said water container 4, and said graduations 55 may indicate such degrees of temperature.

Said thermostatic rod 42 is cooperatively connected with means adapted to thrust said valve 26 open when the temperature of the water 5 falls below the predetermined degree for which said index bar 51 is set, to thus admit gas from said port 13 to said port 14, leading to the burner by which the water is heated. Such means include the axial conical projection 58 on said nut 46 which is fitted in the axial recess 59 in the plunger 60, which is mounted to axially reciprocate between said shoulders 9 and 10 and has the annular flange 61 for contact with the resilient disk 62. Said plunger is thus adapted for slight tilting movement, so that it may uniformly press said disk 62 under stress of said thermostatic couple. The perimeter of said disk 62 is tightly held between said shoulder 9 and the adjacent end of said bushing tube 21, so that it may be rocked on the latter.

Said disk 62 is bent, from a primarily plane sheet, to concavo convex form, and has its concave side presented toward the screw 32 in the axial stem 28 of said valve. Said screw 32 may be axially adjusted in said stem to determine the extent to which said valve 26 may be displaced from its seat by the stress of said thermostatic couple upon said disk 62. That is to say, such adjustment determines the effective area of the opening of said valve, by said disk, and thus determines the maximum volume of gas permitted to pass from the port 13 to the port 14 when said valve is opened.

It is to be understood that the arrangement above described is such that the motion imparted to said resilient disk 62 by the thrust of said annular flange 61 on the plunger 60 is multiplied in its transmission to the stem of said valve 26; said disk 62 acting as a lever fulcrumed at the inner circumference of said bushing 21. Said motion is not only multiplied in its extent, but accelerated, by the snap action of said disk which, when pressed from its normal convex form to a less convex and critical curvature, snaps itself in the opposite direction, i. e., to convex form toward said valve stem 28, which form it retains only as long as it is pressed by said annular flange 61 on the plunger 60. When released from the stress of said couple upon said plunger, (by the expansion of the thermostatic tube 34, due to increment in temperature of the water 5;) said disk snaps back to its original form shown in the drawings, and thus releases said valve 26, so that the latter is snapped shut by its spring 30.

Altho said thermostatic couple was designed for embodiment in the valve structure as shown; it is obvious that a couple with such screw means for adjustably varying the effective length of one member thereof, may be used in other embodiments, for varying the effect of such couple at any given temperature to which it is subjected.

Therefore, I do not desire to limit myself to the precise details of construction and arrangement herein set forth, as it is obvious that various modifications may be made therein without departing from the essential features of my invention, as defined in the appended claims.

I claim:

1. In a thermostatically controlled valve structure; the combination with a casing having a fluid inlet port and a fluid outlet port in spaced relation therein; of a tubular bushing in said casing, forming an axially adjustable valve seat between said ports; a valve fitted to said seat; a spring in said casing, continually stressing said valve toward its seat; and a thermostatic couple adapted to cooperate to displace said valve from its seat; including a resilient disk interposed between said valve and thermostatic couple, and held in said casing by said bushing.

2. In a thermostatically controlled valve structure; the combination with a casing having a fluid inlet port and a fluid outlet port in spaced relation therein; of a tubular bushing in said casing, forming an axially adjustable valve seat between said ports; a valve fitted to said seat; a spring in said casing, continually stressing said valve toward its seat; and a thermostatic couple adapted to cooperate to displace said valve from its seat; including a resilient disk interposed between said valve and thermostatic couple, and held in said casing by said bushing; said disk being normally convex toward said couple, but adapted to snap to oppositely convex position toward said valve, when stressed to a critical form by said couple; whereby said valve is opened by the snap action of said disk when thus stressed.

In testimony whereof, I have hereunto signed my name at Conshohocken, Pennsylvania, this sixth day of November, 1929.

GEORGE WRIGHT.